(12) United States Patent
Krishnan et al.

(10) Patent No.: US 6,812,925 B1
(45) Date of Patent: Nov. 2, 2004

(54) MAP SIMPLIFICATION SYSTEM (75) Inventors: Shankar Krishnan, Chatham, NJ (US); Suresh Venkatasubramanian, Morristown, NJ (US); Nabil Mustafa, Durham, NC (US)

(73) Assignee: AT&T Corp., New York, NY (US)

( * ) Notice: Subject to any disclaimer, the term of this patent is extended or adjusted under 35 U.S.C. 154(b) by 557 days.

(21) Appl. No.: 10/021,645

(22) Filed: Oct. 30, 2001

Related U.S. Application Data (60) Provisional application No. 60/244,964, filed on Nov. 1, 2000.

(51) Int. Cl.[7] ........................... G06T 15/30; G06T 17/00
(52) U.S. Cl. ....................................... 345/423; 345/428
(58) Field of Search ................................ 345/423, 428, 345/441, 468, 420

(56) References Cited

U.S. PATENT DOCUMENTS

| | | | |
|---|---|---|---|
| 5,363,478 A | | 11/1994 | Fiasconaro |
| 5,390,291 A | | 2/1995 | Ohashi |
| 5,850,229 A | | 12/1998 | Edelsbrunner et al. |
| 5,960,118 A | | 9/1999 | Briskin et al. |
| 6,133,921 A | * | 10/2000 | Turkiyyah et al. ........... 345/420 |
| 6,256,039 B1 | | 7/2001 | Krishnamurthy |
| 6,285,372 B1 | * | 9/2001 | Cowsar et al. ............... 345/420 |
| 6,560,361 B1 | * | 5/2003 | Collins ........................ 382/203 |

OTHER PUBLICATIONS

Varadarajan, "Approximating Monotone Polygonal Curves Using the Uniform Metric", 1996, ACM 0–89791–804–5/96/05, pp. 311–318.*

Wang et al, "An optimal Algorithm for constructing the Delaunay triangulation of a set of line segments", 1987 ACM 0–89791–231–4/87/0006/0223, pp. 223–232.*

Mithchell et al, "Minimum–Link Paths Among Obstacles in the plane", 1990 ACM 0–89791–362–0/90/00006/063, pp. 63–72.*

Rajasekaran, "Optimal Parallel Randomized Algorithms for the Voronoi Diagram of Line segments in the plane and related problems", 1994 ACM 0–89791–648–4/94/0006, pp. 57–66.*

Gold, "Map Generalization by Skeleton Retraction", Dept. of Land Surveying and Geo–Informatics.*

Mustafa et al, "Hardware–Assisted View–dependent Map Simplication", 2001, ACM 1–58113–357–X/01/0006, pp. 50–59.*

Canny et al, "Simplified Voronoi Diagrams", 1987 ACM 0–89791–231–4/87/00006/0153, pp. 153–161.*

STorer et al, "Shortest PAths in the Plane with Polygonal Obstacles", 1994 ACM 0004–5411/94/090–0982, pp. 982–1012.*

* cited by examiner

*Primary Examiner*—Mark Zimmerman
*Assistant Examiner*—Scott Wallace
(74) *Attorney, Agent, or Firm*—Daly, Crowley & Mofford, LLP (57) ABSTRACT

A map simplification system performs dynamic view dependent simplification of relatively large geographic maps.

29 Claims, 9 Drawing Sheets

The original map: 261,460 vertices

*FIG. 14*

9,718 vertices, ε = 0.0002

*FIG. 14A*

3,287 vertices, ε = 0.0008

*FIG. 14B*

1,233 vertices, ε = 0.004

*FIG. 14C*

The original map: 151,983 vertices

FIG. 15

14,232 vertices, $\varepsilon$ = 0.0002

FIG. 15A

5,154 vertices, $\varepsilon = 0.0008$

FIG. 15B

2,173 vertices, $\varepsilon = 0.004$

FIG. 15C

MAP SIMPLIFICATION SYSTEM

CROSS REFERENCE TO RELATED APPLICATIONS

The present application claims the benefit of U.S. Provisional Patent Application No. 60/244,964, filed on Nov. 1, 2000, which is incorporated herein by reference.

STATEMENT REGARDING FEDERALLY SPONSORED RESEARCH

Not Applicable.

FIELD OF THE INVENTION

The present invention relates generally to data processing and, more particularly, to systems for displaying maps.

BACKGROUND OF THE INVENTION

As is known in the art, advances in satellite imaging techniques have provided the ability to acquire highly detailed geographical map models. Such models enable interactive visual exploration of massive data sets, much of which is spatial in nature, generated with respect to an underlying geographic domain. For example, geographic information systems deal with the problem of capture, storage and display of large amounts of data with spatial information, such as weather and elevation information. Large telecommunications networks are visualized over an underlying global map. Thus, one of the major challenges facing any interactive system for visualizing such data is the problem of rendering the underlying spatial domain, which could be a political or topographical map of a region, or even a three-dimensional terrain. Such map data can be extremely complex in its finest detail. For example the so-called Tiger data provided by the U.S. Census Bureau contains U.S. maps with a few hundred million vertices occupying over 30 GB of storage.

The maps created by known techniques are seldom optimized for rendering efficiency and can usually be replaced with far fewer primitives, e.g., vertices and chains, without any loss in visual fidelity. In order to further improve the rendering speed and quality, known systems typically compute several versions of these maps. More detailed versions can be used when the object is very close to the viewer, and are replaced with coarser representations as the object recedes. The level of refinement can be adapted in different areas depending on the viewing parameters, which is commonly referred to as view-dependent simplification strategy. In addition, conventional systems can utilize simplification algorithms that are static or dynamic depending upon whether the refinement is performed as a preprocessing step or as part of the rendering loop.

It would, therefore, be desirable to provide a map simplification system that overcomes the aforesaid and other disadvantages.

SUMMARY OF THE INVENTION

The present invention provides a map simplification system for interactively maintaining a planar subdivision, e.g., arrangement of polylines, at varying levels of detail that preserves the shape features of the region, e.g., the essential geometric and topological characteristics. The system provides scalability, real-time performance, and robustness in comparison to conventional geometric map simplification systems. While the invention is primarily shown and described in conjunction with map simplification, it is understood that the invention is applicable to systems in general in which relatively large amounts of data are displayed.

In one aspect of the invention, a system simplifies a map by generating voronoi diagrams for a plurality of non-intersecting chains that define the map and removing non-compliant shortcut segments based upon the voronoi diagrams. The system removes non-proximate shortcut segments based upon the voronoi diagrams. In one embodiment, the system determines shortest paths from the compliant, proximate segments to provide a simplified map.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a map simplification system that performs dynamic view dependent simplification of large geographical maps. Before a detailed description of the invention is undertaken, certain map simplification background information is provided below.

Figure 1:
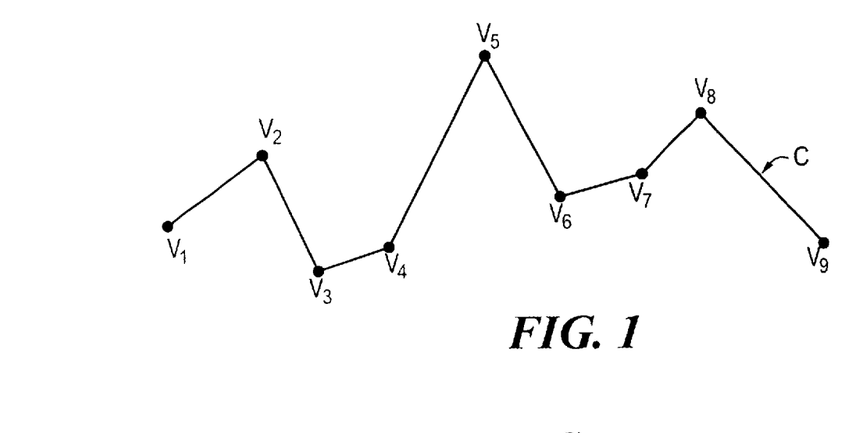
FIG. 1 shows an exemplary chain of size 9 that can be processed by a map simplification system in accordance with the present invention.

The basic unit of a map is a chain. A chain $C=\{v_1, v_2, \ldots, v_m\}$ of size size $(C)=m$ is a polygonal path, with adjacent vertices in the sequence joined by straight line segments as shown in FIG. 1. A shortcut segment for the chain C is a line segment between any two vertices $v_i$ and $v_j$, $i \neq j$, of C. Let $d(\bullet,\bullet)$ denote a distance function between two points in the plane that can correspond to distance under any metric. The distance between a point $v_i$ and a segment $\overline{v_j v_k}$ is defined by the relationship set forth below in Equation 1 below:

$$d(v_i, \overline{v_j v_k}) = \min_{p \in \overline{v_j v_k}} d(v_i, p) \quad \text{Eq. (1)}$$

where p is a point on the segment $\overline{v_j v_k}$. The error of a line segment, $\overline{v_i v_j}$ can be defined as set forth below in Equation 2:

$$\Delta(\overline{v_i v_j}) = \max_{i \leq k \leq j} d(v_k, \overline{v_i v_j}) \quad \text{Eq. (2)}$$

A further chain $C'=\{v_1=v_{j1}, v_{j2}, \ldots, v_{jm'}=v_m\}$ has vertices that are a subsequence of the vertices of the original C. The distance $d(\bullet,\bullet)$ between the two chains can be expressed as shown below in Equation 3:

$$d(C', C) = \max_{1 \leq j < m'} \Delta(\overline{v_{ij} v_{ij+1}}) \quad \text{Eq. (3)}$$

A chain is referred to as self-intersecting if any two of its line segments intersect. The endpoint vertices of the original chain C, vertices $v_i$ and $v_k$, are called the start and end vertices respectively. Unless otherwise specified, all chains are assumed to be non self-intersecting. Two chains intersect if they share any vertex other than their endpoints, or if any pair of line segments in the chains intersect.

A map M comprises a set of non-intersecting chains. The size of a map is the sum of the sizes of its chains. The objective of map simplification is to take a map $M=\{C_1, C_2, \ldots, C_n\}$ and a tolerance parameter array $\{\epsilon_1, \epsilon_2, \ldots, \epsilon_n\}$ as input, and compute a map $M'=\{C'_1, C'_2, \ldots, C'_n\}$ such that the following conditions are met:

1. For each i, the vertices of $C'_i$ are a subsequence of the vertices of $C_i$.
2. For each i, $d(C'_i, C_i) \leq \epsilon_i$.
3. For all $1 \leq i, j \leq n$, the chains $C'_i$ and $C'_j$ do not intersect.
4. The quantity $(\Sigma_i \text{size }(C'_i))$ is minimum over all $M'$ satisfying conditions 1,2 and 3.

Figure 2:
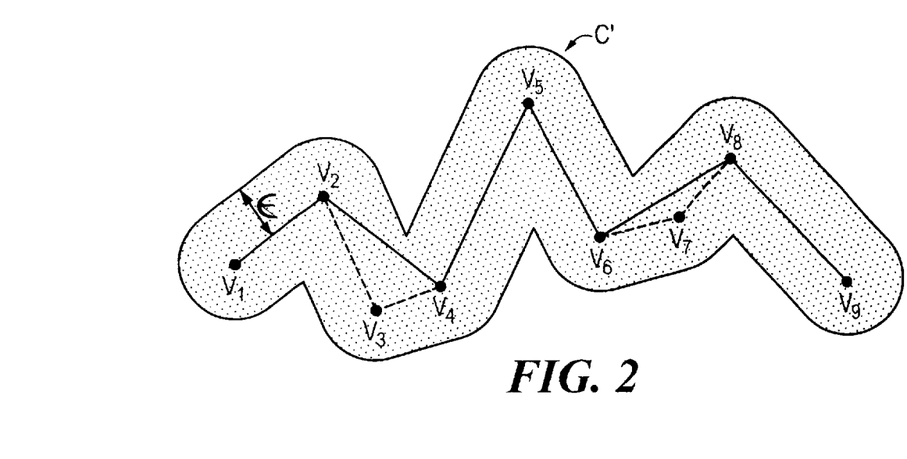
FIG. 2 is a simplified chain from the chain of FIG. 1.

If a chain $C'_i=\{v_1=v_{j1}, v_{j2}, \ldots, v_{jm'}=v_m\}$ satisfies conditions and above, the chain is a valid simplification of the chain $C_i$. FIG. 2 shows one valid simplification of the chain shown in FIG. 1. Note that condition 1 above implies that the line segments $(v_{j1}, v_{j2}), (v_{j2}, v_{j3}), \ldots, (v_{jm'-1}, v_{jm'})$ are shortcut segments of the chain $C_i$.

Similarly, if all the chains in the map M' are a valid simplification of their corresponding chains in the original map M, then the map M' is a valid simplification of the original map M.

The distance function d( ) expresses the similarity between maps. Intuitively, it is desired to simplify the map as far as possible (expressed by the minimization constraint) while preserving visual fidelity (expressed by the distance constraint).

Note that there are two independent components of similarity, namely geometric and topological. The topological constraint is expressed in the condition that the output set of chains is non-intersecting, and that each output chain has a corresponding input chain. The geometric constraint is expressed by the distance function d( ). Most approaches for map simplification attempt to preserve one or the other; a simultaneous preservation of both constraints is challenging. Various attempts have been made to improve the map simplification process. These attempts are static formulations that do not interactively deal with simultaneous preservation of both topographical and geometrical constraints.

Map simplification or generalization is a concern of the cartographic community. Traditionally, the focus has been on subjective measures of simplification such as aesthetic considerations and the retention of (subjectively decided) important features. One of the first methods for map simplification was the algorithm proposed by D. H. Douglas and T. K. Peucker in "Algorithms for the reduction of the number of points required to represent a digitized line or its caricature," The Canadian Cartographer, 10:112–122, 1973, which is incorporated herein by reference. This algorithm was relatively efficient, and it was observed that the simplifications produced by this method tended to conform to the subjective solutions produced by domain experts.

Figures 3A, 3B:
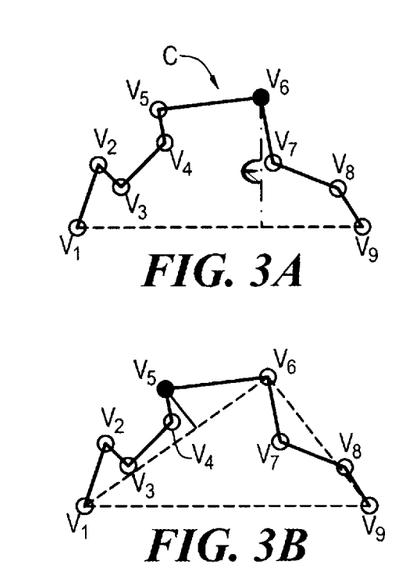
FIGS. 3A–3C taken together show a pictorial representation of solution refinement processing that can be performed by a map simplification system in accordance with the present invention.
Figure 3C:
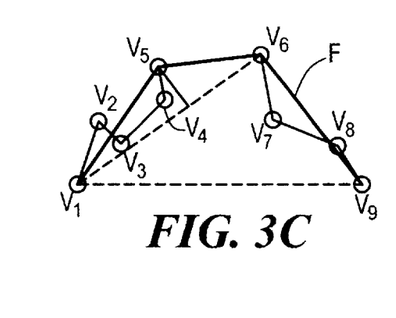

The algorithm works by successive refinement of an initial solution as shown in FIGS. 3A–C using a greedy approach. The initial solution (FIG. 3A) is obtained by forming a line segment connecting the endpoints $v_1, v_9$ of the chain C. If all vertices of the chain are within distance $\epsilon$ of this solution, the algorithm terminates. Otherwise, it finds the vertex, e.g., $v_6$, that is furthest from the line segment, and creates a refinement consisting of the two line segments, shown as dashed lines from $v_6$ to $v_1$ and $v_6$ to $v_9$, connecting this line to the endpoints $v_1, v_9$, as shown in FIG. 3B. This process is repeated recursively on each of the segments. The final solution is shown in FIG. 3C. An exemplary psuedo code implementation of the algorithm (Algorithm 1) is shown below:

```
Algorithm 1 Douglas_Peucker(Input Chain C, Tolerance Parameter ε)
Input: Polygonal chain C = {v₁, v₂,..., vₘ} and tolerance parameter ε
Output: Polygonal chain C' = v₁ = v_{j1}, v_{j2},..., v_{jm'} = vₘ}, with d(C',
                            C) ≤ ε

Q ← {(v₁, vₘ)}
C' ← Ø
while Q ≠ Ø do
    /* pick any shortcut segment */
    Remove (v₁, vₘ) from Q
    dmax ← 0
    vmax ← 0
    /* Find furthest vertex from shortcut segment v̄ᵢvⱼ
    */
    for k = (i + 1) to (j - 1) do
        dist ← d(vₖ,v̄ᵢvⱼ)
        if dist > dmax then
            dmax ← dist
            vmax ← k
        endif
    if dmax > ε then
        /* v̄ᵢvⱼ is not a good approximation */
        Insert (v₁, v_{vmax}) and (v_{vmax}, vⱼ) into Q
    else
        /* v̄ᵢvⱼ is an edge in the solution */
        C' = C'∪{vᵢ,vⱼ}
```

-continued

```
Algorithm 1 Douglas_Peucker(Input Chain C, Tolerance Parameter ϵ)
Input: Polygonal chain C = {v₁, v₂,..., vₘ} and tolerance parameter ϵ
Output: Polygonal chain C' = v₁ = vⱼ₁, vⱼ₂,..., vⱼₘ' = vₘ}, with d(C',
        C) ≤ ϵ
``` endwhile
Return C'

Although the algorithm is simple and efficient, it can be applied only to single chains and it can be readily seen that when applied on an entire map, e.g., by applying it successively on individual chains, the resulting map is likely to have intersections. To eliminate intersections, the Douglas-Peucker algorithm is run first and a local improvement technique is used. More recently, there has also been a focus on methods based on so-called constrained Delaunay triangulations. These methods avoid the problem of chain intersection by being more global in nature. The main idea of these methods is to construct a variant of a Delaunay triangulation on the input map and use edges of this triangulation to construct a simplified map.

None of these methods for chain simplification guarantee that the output chain will not intersect itself so as to ensure that self-intersections do not occur.

In general, the map simplification system of the present invention considers shortcut segments from chains as possible line segments in a valid simplification to determine those shortcut segments that can appear in valid simplifications, which are referred to as valid shortcut segments.

It is understood that there are many ways to build an initial set of shortcut segments. For a chain of size m, there are $O(m^2)$ possible shortcut segments. However, quadratic size for large maps can be prohibitive, so that in one embodiment, a heuristic is used to choose a small set of "good" shortcut segments. Once the system identifies an initial set of candidate short-cut segments, invalid segments are removed.

For a shortcut segment to be valid, it must satisfy both geometric and topological conditions. Any shortcut segment that might be present in a valid simplification of a chain C must be within distance ϵ of C. More precisely, a shortcut segment $\overline{v_j v_k}$ is said to be proximate if $\Delta(\overline{v_j v_k}) \leq \epsilon$. After picking shortcut segments s for chain $C_i$ and segments s' for sub chain $C_j$, the system should ensure that the segments s, s' do not intersect. This enables the chains to be simplified independently of each other.

Figure 4:
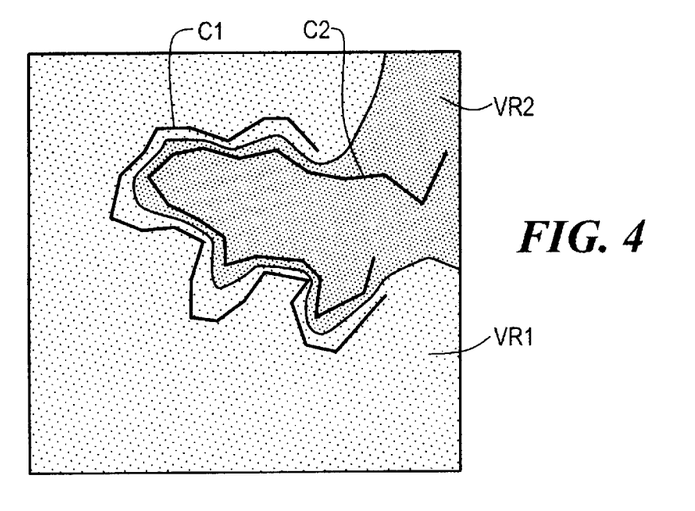
FIG. 4 is an exemplary Veronio diagram that can be generated by a map simplification system.

Consider the Voronoi diagram of FIG. 4 showing a set of first and second chains C1, C2 in the input map. As known to one of ordinary skill in the art, the Voronoi diagram of a set of primitives (like points and line segments) in the plane is a partition of the real plane into regions such that each region comprises all points that are closer to a single primitive than to any other primitive. Since Voronoi regions VR1, VR2 of non-intersecting chains partition the plane, two different shortcut segments lying inside their respective Voronoi regions cannot intersect. Thus, by requiring that shortcut segments lie completely inside the Voronoi regions of their respective chains, it is ensured that the desired condition is met. These regions are referred to as the compliant regions. Shortcut segments lying inside their compliant regions are referred to as compliant shortcut segments. Thus, it can be seen that that all shortcut segments that are both proximate and compliant are valid.

Figure 5:
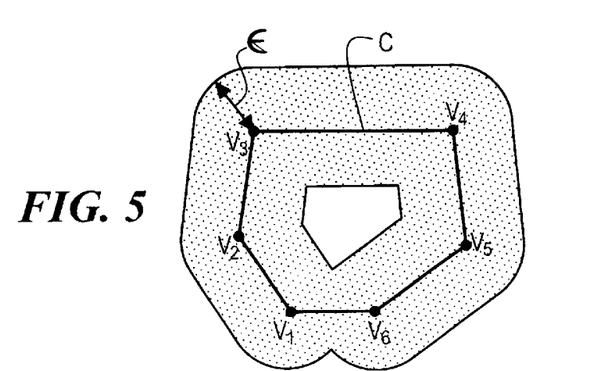
FIG. 5 is pictorial representation of a compliant shortcut segment that is not proximate.

As illustrated in FIG. 5, consider a region consisting of all points within distance ϵ of the chain C, i.e, the region $C \oplus B_\epsilon$, where $B_\epsilon$ is the ball of radius ϵ with respect to the underlying distance function, and ⊕ is the standard Minkowski sum. Given a vector space V, the Minkowski sum P⊕Q of two sets P, Q⊆V is the set {p+q|p∈P, q∈Q}. Any shortcut segment that does not lie completely inside this region is not proximate, though the converse does not hold, as shown. Instead of using the Voronoi diagram to define compliant shortcut segments, the system of the present invention uses an ϵ-Voronoi diagram.

Figure 6:
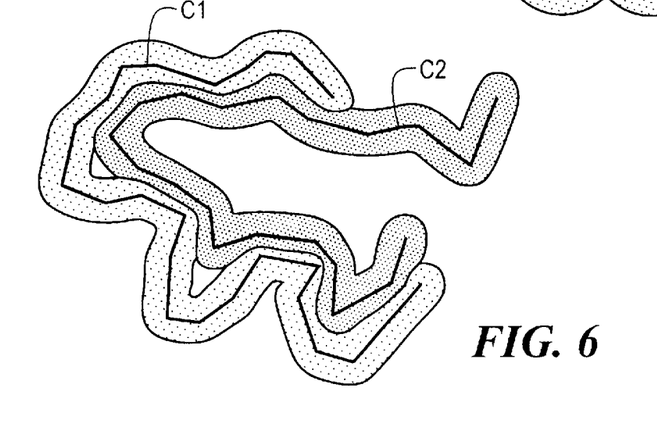
FIG. 6 is an exemplary $\epsilon$-Voronoi diagram that can be used by a map simplification system in accordance with the present invention.

As illustrated in FIG. 6, an ϵ-Voronoi diagram is a Voronoi diagram with respect to the distance measure expressed below in Equation 4:

$$d_\epsilon(p, q) = \left\{ \begin{matrix} d(p, q) & d(p, q) \leq \varepsilon \\ \infty & otherwise \end{matrix} \right\} \qquad \text{Eq. (4)}$$

An advantage of using ϵ-Voronoi regions is that they are subsets of the corresponding Voronoi region. Further, the non-proximate shortcut segments that do not lie within a Minkowski region will also not lie in a ϵ-Voronoi region (due to the definition of the distance measure for ϵ-Voronoi region). Thus, these segments can now be rejected, without having to do proximity testing on them.

Given a set of valid shortcut segments for a chain, a valid simplification can then be determined. The minimum-sized simplification (with respect to the set of base shortcut segments) is precisely a shortest path from the start vertex to the end vertex of the chain using the valid shortcut segments. Note that this step introduces the possibility of self-intersections. In one embodiment, chains are partitioned into so-called safe sets so that any simplification method is guaranteed not to create self-intersections. An exemplary technique for generating safe sets is described in A. Mantler and J. Snoeyink, "Safe sets for line simplification" in 10*th Annual Fall workshop on Com-putational Geometry,* 2000, which is incorporated herein by reference. Algorithm 2 below summarizes safe set generation.

```
Algorithm 2 MapSimplification(Input Map M, Tolerance Parameter Array
    E) Input: Map M = {C₁,...,Cₙ}, Tolerance parameters E = {ϵ₁,...ϵₙ}
        Output: Simplified map M' = {C'₁,...,C'ₙ}, with d(C'ᵢ,Cᵢ) ≤ ϵᵢ

/* Initialize set of shortcut segments Sᵢ for each chain*/
for Chain C₁E M do
    Sᵢ = Find_Base_Segments (Cᵢ)
Compute the ϵ-Voronoi diagram of M.
/* Remove set of non-compliant segments from the map */
Remove_NonCompliant_Segments (M).
for Chain C₁E M do
    /*Remove non-proximate segments from each chain
    */
    Remove_NonProximate_Segments(Cᵢ, Sᵢ).
for Chain Cᵢ in M do
    /*Find shortest path by shortcut segments Sᵢ of Cᵢ.
    */
        C'ᵢ = Find_Shortest_Path(Cᵢ, Sᵢ)
```

An exemplary algorithm for implementing map simplification in accordance with the present invention is now described. The input to the simplification algorithm is a map $M = \{C_1; \ldots ; C_n\}$ consisting of n non-intersecting chains. A set of tolerance parameters $\epsilon = \{\epsilon_1, \ldots, \epsilon_n\}$ is also given, where the chain $C_i$ is simplified with tolerance parameter $\epsilon_i$.

Figure 7:
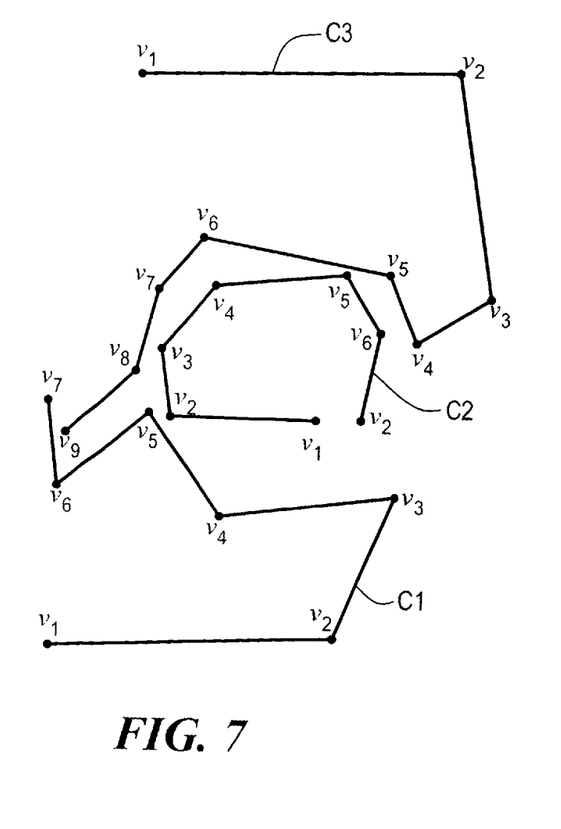
FIG. 7 is a pictorial representation of exemplary input chains that can be processed by a map simplification system in accordance with the present invention.

FIG. 7 shows an exemplary set of chains used to illustrate map simplification in accordance with the present invention. The algorithm is provided with a set of candidate short-cut segments $S_i$ for each chain $C_i$. One way to generate this set for each chain is to compute all $O(m^2)$ pairwise segments for a chain of size m. While this provides a complete set of segments for computing a simplification, its quadratic size is prohibitively expensive. However, in practice, the system select a "good" set of base shortcut segments, whose size is smaller, to gain significant improvements in speed. Thus, the system can select a linear-sized set of base shortcut segments.

As described above, Algorithm 1 above operates so that once the algorithm finds a segment which is proximate, it stops the recursion, and adds that segment to the simplified chain. Algorithm 1 is modified to retain all shortcut segments obtained during a simulation instead of retaining only the proximate segments. Further details are described by R. G. Cromley, "Hierarchical methods of line simplification", *Cartography and Geographic Information Systems*, 18(2): 125–131, 1991, which is incorporated herein by reference. Algorithm 3 below shows an exemplary implementation of this processing.

---

Algorithm 3 Find_Base_Segments(Input Chain $C_i$)
Input: A Chain $C_1 = \{v_1,..., v_m\}$
Output: The set of base shortcut segments $S_i$

---

$Q \leftarrow \{(v_1, v_m)\}$
$S_i \leftarrow \emptyset$
while $Q \neq \emptyset$ do
  /* pick any shortcut segment */
  Remove $(v_i, v_j)$ from Q
  dmax $\leftarrow$ 0
  vmax $\leftarrow$ --1
  /*Find furthest vertex from shortcut segment $\overline{v_i v_j}$
  */
  for k = (i + 1) to (j – 1) do
    dist $\leftarrow$ $d(v_k, \overline{v_i v_j})$
    if dist $\geq$ dmax then
      dmax $\leftarrow$ dist
      vmax $\leftarrow$ k
    endif
  if vmax $\neq$ –1 then
    /* Associate maxdist with segment $\{v_i,v_j\}$ */
    $\Delta \overline{v_i v_j}$ = max dist
    Insert $(v_i, v_{vmax})$ and $(v_{vmax}, v_j)$ into Q
    /* Add $\overline{v_i v_j}$ as a potential edge for some $\epsilon$ */
    $S_i = S_i \cup \{v_i, v_j\}$
  endif
endwhile
Return $S_1$

---

Algorithm 3 provides certain advantages over convention map simplification processing. For example, the system generates a linear sized set of shortcut segments. Therefore, the size decreases from $O(m^2)$ to $O(m)$ (2m−1 to be exact). Note that the hardness of approximation of the problem implies that any heuristic is not likely to yield a close-to-optimal solution, thus making efficiency a more important concern. Another advantages results from the computation of $\Delta(\overline{v_i v_j})$. The system obtains this value as a side product of Douglas Peucker algorithm. Note that for each segment $\overline{v_i v_j}$ thus retained, the distance of the furthest vertex of the chain from this segment, $\Delta(\overline{v_i v_j})$. is the value of $\epsilon$ above which this segment becomes proximate. Thus, this first step eliminates the need to explicitly determine (for a given $\epsilon$) which shortcut segments are proximate.

Figure 8:
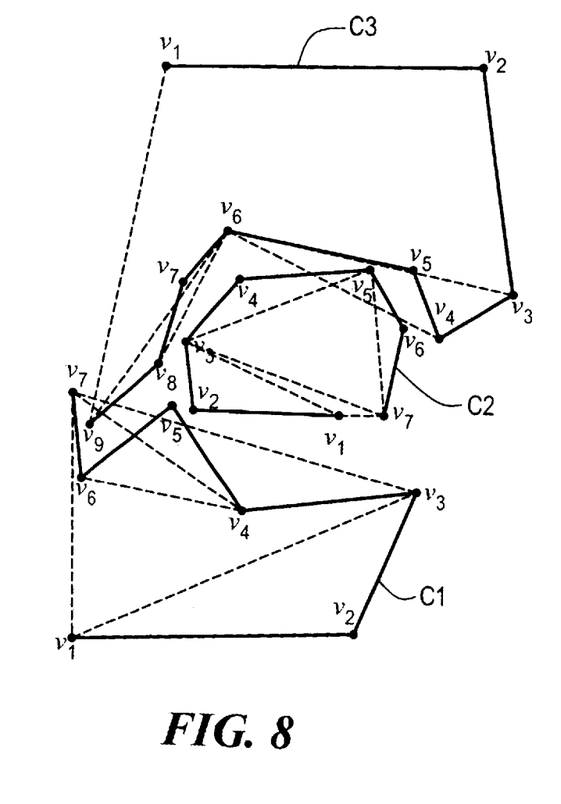
FIG. 8 is a pictorial representation of the input chains of FIG. 7 after preprocessing in accordance with the present invention.

As illustrated in FIG. 8, Algorithm 3 is run for each chain as a preprocessing step, generating the base set of shortcut segments $S_i$ (shown as dashed lines) for each chain $C_i$. The storage required by this preprocessing step is bounded by $O(|M|)$, where $|M|$ is the complexity of the input map, and thus the total memory requirement is linear in the input size. FIG. 8 shows the candidate set of shortcut segments determined by the algorithm, together with the input chains.

The first step in the algorithm is to compute the $\epsilon$-Voronoi diagram (see FIG. 6) of the set of chains, which is merely the Voronoi diagram of the chains with respect to the distance function $d_\epsilon$ defined in Equation (1). Note that for each chain, a different value of $\epsilon$ is used. In an exemplary embodiment, a hardware-based implementation is used to compute Voronoi diagrams.

For each chain $C_i$, the system computes a set of 3-dimensional primitives based on the vertices and line segments of that chain, and renders all the primitives of a chain $C_i$ with a unique color, say $cl_i$. Once all the primitives of all the chains are rendered, a Z-buffer is used to compute the lower envelope of these primitives efficiently. The stencil buffer then gives the Voronoi diagram for the chains, where the region in the stencil buffer with color $cl_i$ is the Voronoi region for the chain $C_i$. As is known in the art, the stencil buffer is a standardized storage area available in commercially available graphics cards and boards. After the Voronoi diagram is computed, the stencil buffer gives the Voronoi diagram for the chains, where the region in the stencil buffer with value i is the Voronoi region for the chain $C_i^3$.

Figure 9:
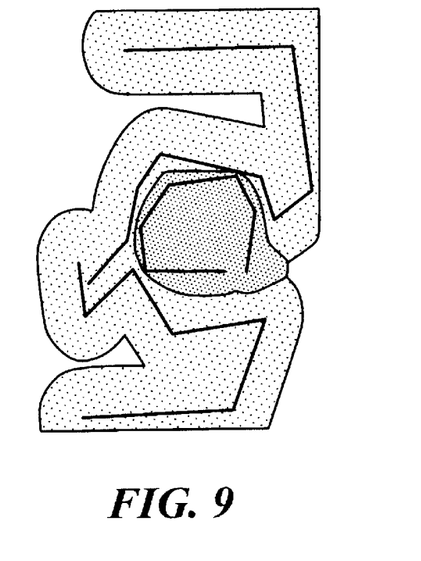
FIG. 9 is an $\epsilon$-Voronoi diagram of the input chains of FIG. 8.

FIG. 9 shows the $\epsilon$-Voronoi diagram for the three chains of FIG. 7. Once the system draws the $\epsilon$-Voronoi diagram on the stencil buffer, it can be used to find the set of compliant shortcut segments. Recall that a compliant shortcut segment lies completely inside the $\epsilon$-Voronoi region of its chain. For each chain $C_i \in M$, the system first sets the stencil test to pass only if the stencil value at a pixel is not equal to i. It is understood that the stencil buffer is a part of the framebuffer in a conventional graphics card. The stencil buffer can be defined as a matrix of integer values, where each entry corresponds to a pixel on a display screen. During processing, the matrix is manipulated and used to direct future stages of the algorithm. The system then renders all the shortcut segments $S_i$ for the chain $C_i$ with unique colors. This is done for all the chains.

Note that if the number of shortcut segments, say $|S|$, is greater than $2^{32}$−1, the algorithm given in Algorithm 4 below would have to be repeated $$\left\lceil \frac{|S|}{2^{32} - 1} \right\rceil$$

times for an 8-bit per channel color buffer.

---

Algorithm 4 Remove_NonCompliant_Segments(Input Map M)
Input: A Map $M = \{C_1,...,C_m\}$
Output: The set of compliant shortcut segments $S = \{S_1,...S_m\}$.

--- repeat
  for Chain $C_i$ E M do
    glStencilFunc(GL_FAIL, GL_FAIL, GL_PASS)
    glStencilTest(GL_NEQUAL, i)
    for Shortcut segment $\{v_j, v_k\}$ E $S_i$ do
      Set( Color of $\{v_j, v_k\}$)
      Draw($\{v_j, v_k\}$)
  ColorBuffer = ReadColorBuffer ()
  for Unique color c in ColorBuffer do
  Remove segment whose color is c from S.
until S does not change

---

Once the system draws all the shortcut segments in S with unique color for all the chains, the system reads the state of the color buffer, such as by using the glReadPixels( ) call in OpenGL, and scans the pixels. Based upon the stencil test described above, it follows that only the shortcut segments $S_i$ of chain $C_i$ that go outside the e-Voronoi region of $C_i$ appear in the color buffer. Therefore, if the color of a shortcut segment is present in the color buffer, the system immediately knows that it is non-compliant because each shortcut segment is drawn with a unique color value. The system removes the detected non-compliant segments from the original set S of shortcut segments. It is possible, however, that a non-compliant segment is occluded by another segment (or a group of segments). In this case, the system may wrongly conclude that it is compliant. This problem is solved by repeating the process of segment elimination until the set S remains unchanged. For the maps tested (see FIGS. 14 and 15), two such repetitions are typically needed.

Figure 10:
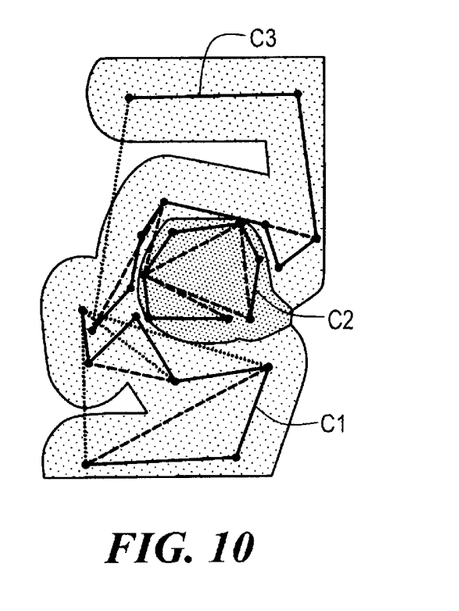
FIG. 10 is a pictorial representation of a set of compliant shortcut segments and non-compliant shortcut segments during map simplification processing in accordance with the present invention.

FIG. 10 illustrates the algorithm by showing the initial set of shortcut segments (solid lines) for all the chains, the compliant shortcut segments (dashed lines) and the non-compliant ones (dotted lines).

As described above, there are cases, e.g., FIG. 5, where the previous phase cannot detect and remove all the non-proximate shortcut segments. Suppose the set of shortcut segments output is the set S. As described above in the preprocessing step, for each shortcut segment $\overline{v_i v_j}$ the system maintains the maximum distance ($\Delta(\overline{v_i v_j})$) to the original chain. Given all the compliant segments, the system compares this value with the corresponding tolerance parameter for the chain and determines whether it is proximate or not.

Figure 11:
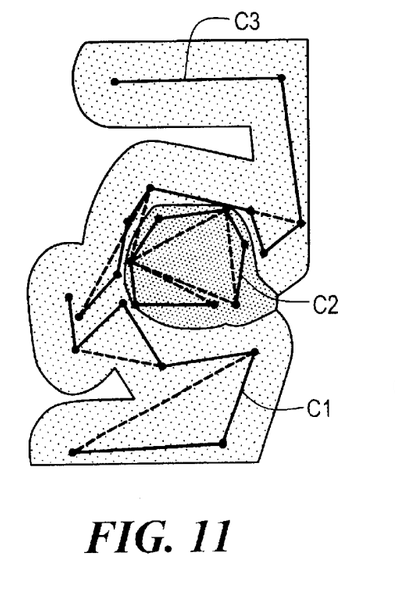
FIG. 11 is a pictorial representation of a set of compliant proximate shortcut segments and compliant non-proximate segments after further map simplification processing in accordance with the present invention.

FIG. 11 shows the proximate segments that are retained after this step. After removing remaining non-proximate segments, the system has a set of compliant, proximate segments $S_i$ for each chain $C_i \in M$. Next, the system finds a shortest path from the start to the end of each chain using the segments in $S_i$.

For example, let $G_i = (V_i, E_i)$ be an undirected graph. For each vertex $v_j \in C_i$, the system adds the node $n_j$ to $V_i$. Similarly, for each shortcut segment $(v_j, v_k) \in S_i$, the system adds the edge $(n_j, n_k)$ to $E_i$. Now the system finds the shortest path from the first node to the last node in the graph $G_i$. Since the graph $G_i$ is unweighted, this amounts to doing a breadth-first search from the first node. However, the edges of this graph are not arbitrary since they form a subset of the edges encountered in the Douglas-Peucker algorithm. Thus, instead of computing a breadth-first traversal of the graph, the system can use a greedy algorithm that from the current node v (the first node initially) moves to the node that is the furthest number of links away from the node v in the chain (moving from the beginning to the end).

Figure 12:
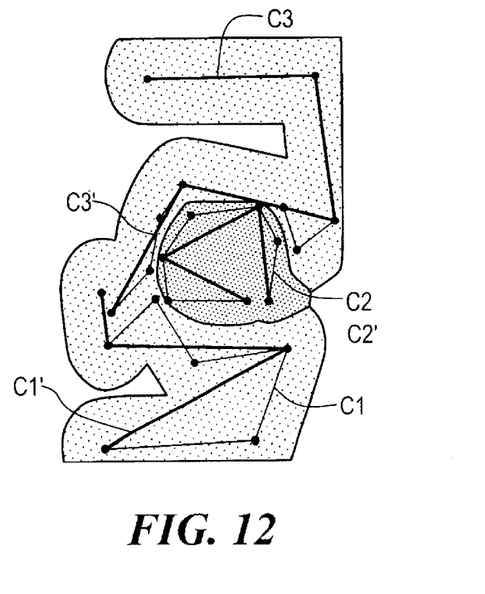
FIG. 12 is a pictorial representation of simplified chains and input chains after map simplification processing in accordance with the present invention.

The system replaces each node in the shortest path thus found with the corresponding vertex of the chain $C_i$. Since each edge in the graph $G_i$ corresponds to a compliant proximate shortcut segment in $S_i$, the corresponding sequence of vertices forms a valid simplification $C'_i$ of the input chain $C_i$. Since the path is a shortest path, the simplification is optimal for the set of valid shortcut segments. FIG. 12 shows the final simplification produced by the system with the simplified chains shown in bold.

There are many situations where maps contain point features whose sidedness (with respect to boundaries) is desirable to preserve. For example, a careless simplification of a map of Massachusetts could cause a feature corresponding to the city of Boston to end up in the Atlantic Ocean. Such conditions can be expressed by specifying that certain points must remain on the same side of certain boundaries as they were in the input. These constraints are referred to as point constraints.

The above algorithm can be readily modified to respect certain types of point constraints. Consider a point constraint (p, C), where p is a point and C is the constrained chain. For each such constraint, the system treats point p as a chain of length 0 having a tolerance parameter equal to that of $C^5$. This ensures that the chain cannot flip sides. If there are multiple chains constrained by a point, then the system chooses the tolerance to be the maximum of the chain tolerances.

Suppose there are two chains $C_1$, $C_2$ near a point p, but only the constraint (p, C) is present. This might force $C_2$ to be simplified to a lesser degree than possible. In general though, if a point is constrained with respect to all chains surrounding it, the above approach will not over-constrain the problem.

Figure 13:
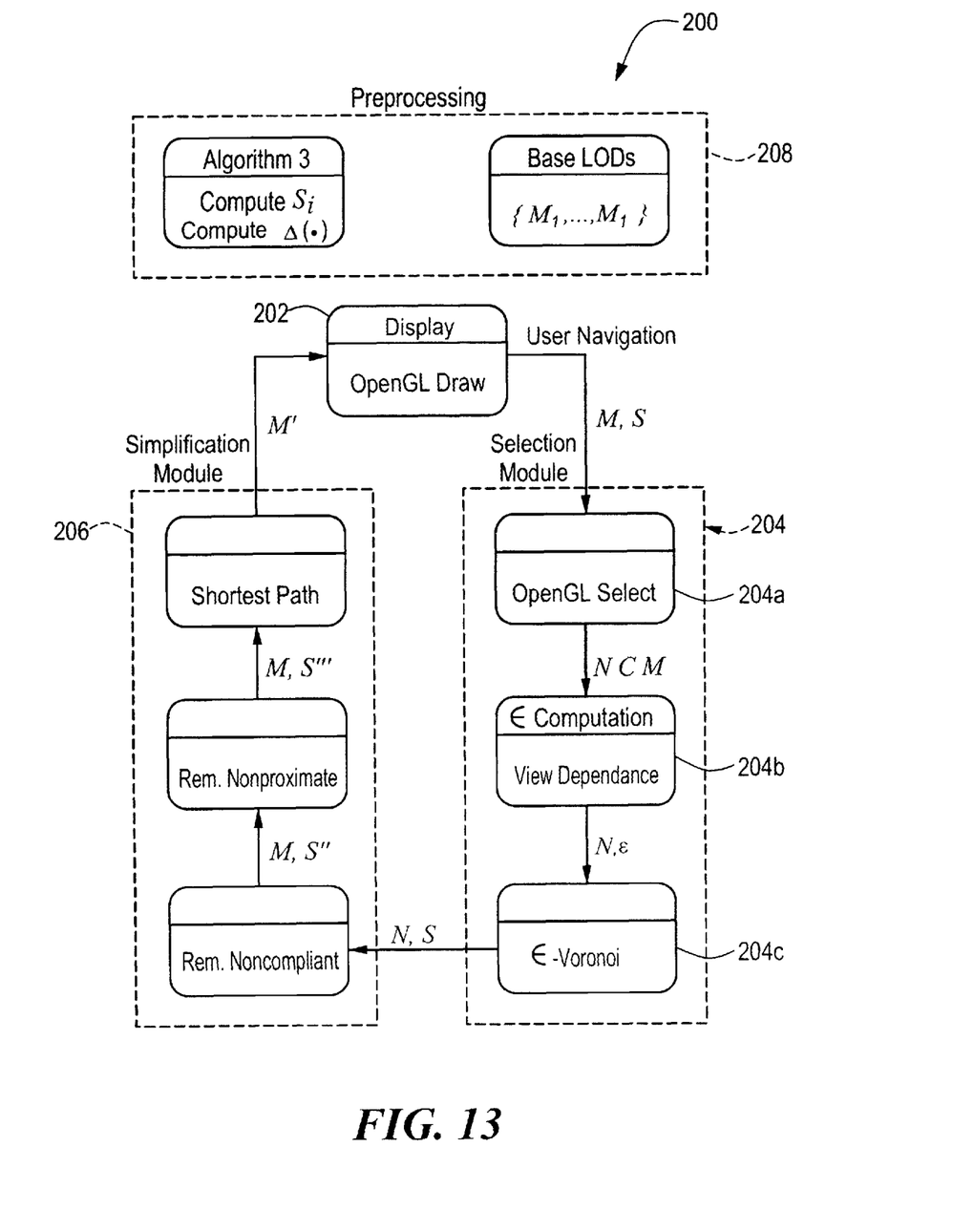
FIG. 13 is a schematic depiction of an exemplary architecture for map simplification processing in accordance with the present invention.

FIG. 13 shows one particular embodiment of a run-time system 200 for implementing a map simplification system in accordance with the invention. The run time system 200 includes three main modules: the display module 202 that renders the simplified chains and provides user interactivity; the selection module 204 that takes the current viewing parameters and generates a set of chains to be simplified; and the simplification module 206 described above, which simplifies a given set of chains and returns the output to the display routine. The system 200 iterates through each of these modules at each frame. The system also has a preprocessing module 208, which is invoked once when the system is initialized.

The preprocessing module 208 first computes an initial set of shortcut segments for each chain in the map as described above. Along with this information, the system also maintains the bounding box of each input chain. As known to one or ordinary skill in the art, the bounding box of a chain is the smallest rectangle that completely contains the chain. Maintaining the bounding box refers to computing the length and width of this rectangle, for each chain, and storing it along with other information pertaining to the chain. Next, for a fixed set of tolerance values $\{\epsilon_1 < \epsilon_2 < \ldots < \epsilon_1\}$, the system invokes the simplification module 206 on the map M, obtaining a set of simplifications $M_j$. For a given chain $C_i$, the simplified chain $C'_{i,j} \in M_j$ represents the base level-of-detail (LOD) for the chain $C_i$ for values of $\epsilon$ between $\epsilon_j$ and $\epsilon_j+1$ (note that different chains can have different $\epsilon$ values). The system uses these base LODs as the input into the run-time simplification system, which produces continuous simplifications. This step provides real-time interactivity.

The selection module 204 is the first stage of the run-time system. It takes as input the chain bounding boxes generated by the preprocessing module 200 and information about the current viewing parameters.

For large maps, typically only a small portion of the map is visible at any given time. Therefore, significant performance gains can be achieved by eliminating portions of the map outside the viewport. Using the OpenGL GL SELECT sub module 204a of the selection module 204, for example, the system eliminates chains that are not currently visible.

Chains that are closer to the viewer should appear in more detail than chains that are further away. The selection module 204 creates this effect by computing a view-dependent tolerance parameter for each chain in the view dependance sub module 204b, giving chains that are closer a smaller tolerance. Thus, map simplification in accordance with the present invention utilizes varying values of error parameters to incorporate view-dependence. Note that the mechanism for generating tolerances is modular; other effects can be created as well, such as focusing on user-specified chains.

Using these chain-specific tolerance parameters, the $\epsilon$-Voronoi module 204c can now pick the appropriate base LOD for each chain. Specifically, if the tolerance for chain $C_i$ is $\epsilon$, then it picks the LOD $C'_{i,j}$ where $\epsilon_j < \epsilon \leq \epsilon_{j+1}$. Note that for different chains there can be different LODs, which results from having a view where some chains are closer than others.

For each LOD chosen, the selection module 204 scans its set of shortcut segments (generated during the preprocessing step) and eliminates all those segments that are not proximate with respect to the tolerance for that chain. Note this implementation for generating shortcut segments ensures that for each segment, the system knows the value of $\epsilon$ above which it is proximate.

The chains output by the selection module 204 are sent to the simplification module 206. As described above, sub modules 206a,b,c in the selection module remove noncompliant segments (algorithm 4) and nonproximate segments and determine shortest paths, as described in detail above. The simplified chains are rendered by the display module 202, where user interaction takes place.

EXAMPLE

An exemplary map simplication system in accordance with the present invention was developed with the C++ programming language over the OpenGL library and run on an SGI Onyx workstation with an R10000 processor with 2 GB of main memory. The system was used for three different maps. While this example is described in conjunction with an Onyx workstation, it is understood that a variety of other suitable machines can be used including SGI machines and PCs.

Figure 14:
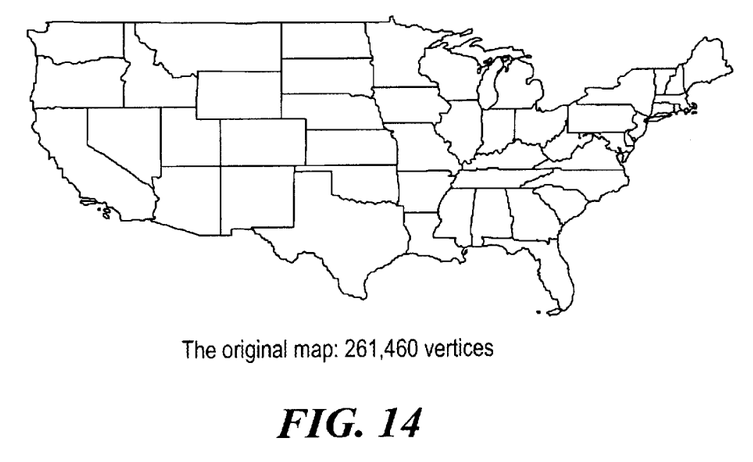
FIG. 14 is a map of the United States having 261,460 vertices and 375 chains.
Figure 14A:
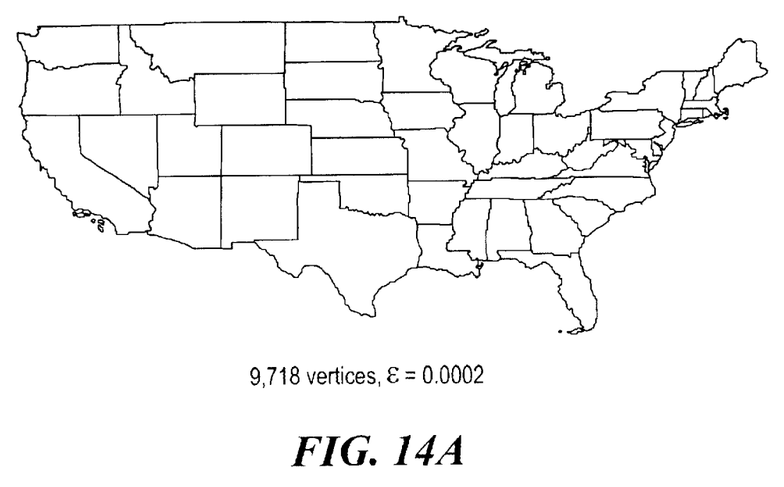
FIGS. 14A–C are simplified maps of the map of FIG. 14 at varying levels of simplification in accordance with the present invention.
Figure 14B:
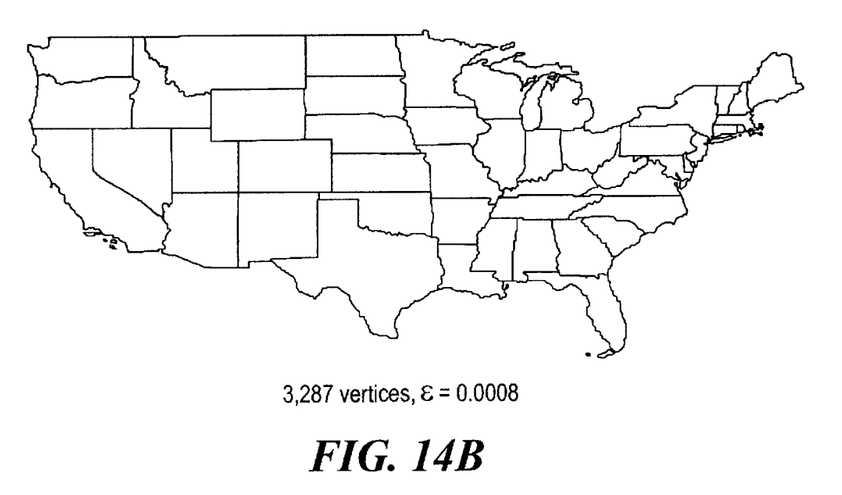
Figure 14C:
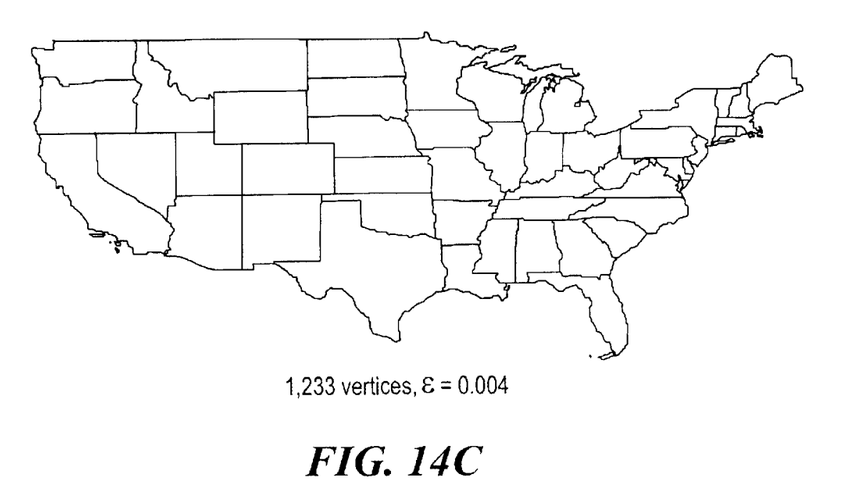

FIG. 14 shows a first map USA, which is a map of the United States, that contains the national and state boundaries. It has 261,460 vertices and 375 chains. FIGS. 14A–C show the first map at varying levels of detail (vertices) for given tolerance parameters $\epsilon$ as set forth in Table 1 below:

TABLE 1

| E | USA | TEXAS | EURASIA |
|---|---|---|---|
| 0.0 | 261,460 | 151,983 | 222,969 |
| 0.0002 | 9,718 | 14,232 | 46,792 |
| 0.0008 | 3,287 | 5,154 | 20,094 |
| 0.0040 | 1,233 | 2,173 | 7,867 |

Figure 15:
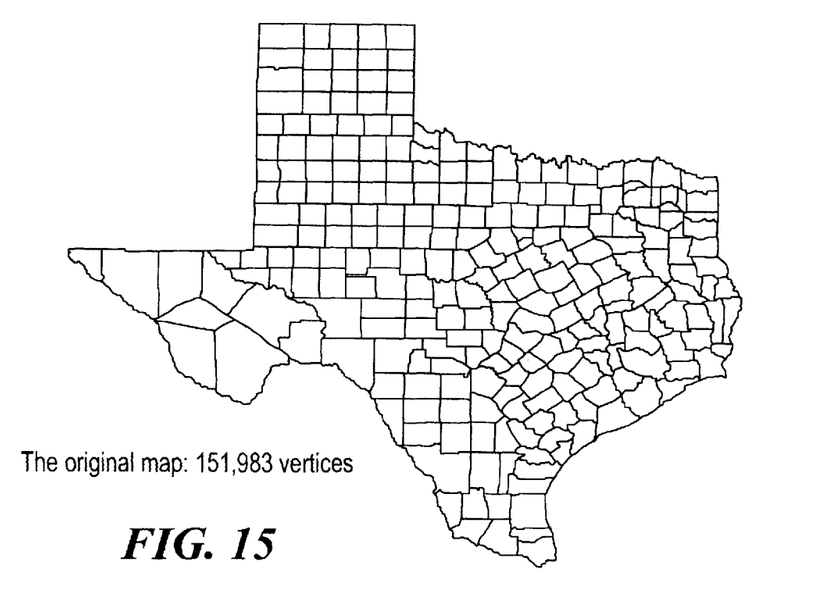
FIG. 15 is a map of the state of Texas having 151,983 vertices and 817 chains.
Figure 15A:
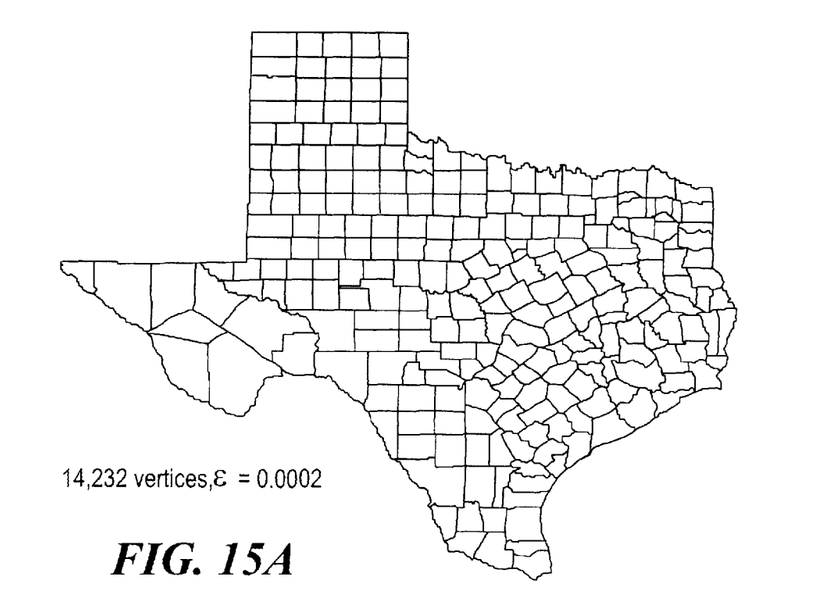
FIGS. 15A–C are simplified maps of the map of FIG. 15 at varying levels of simplification in accordance with the present invention.
Figure 15B:
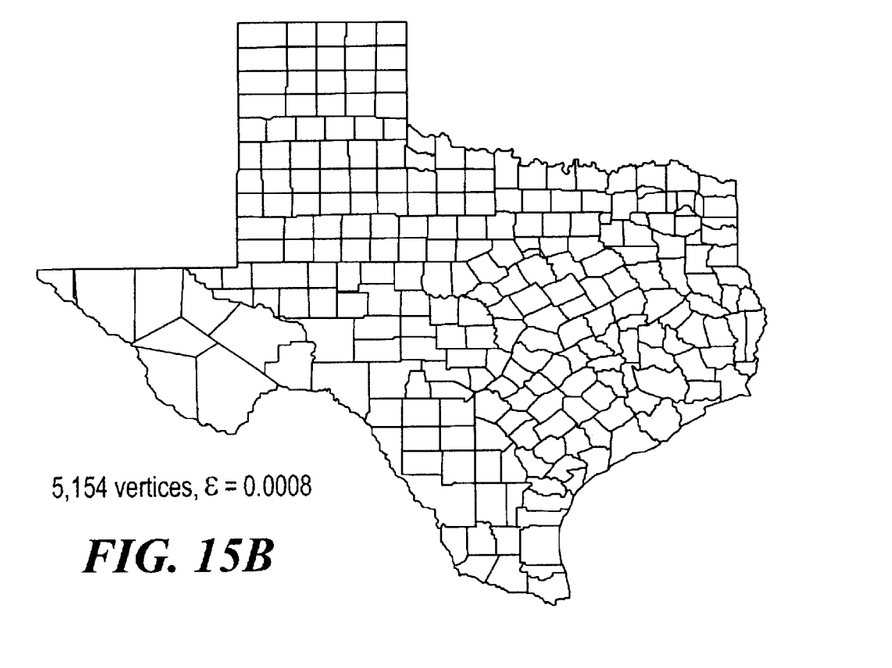
Figure 15C:
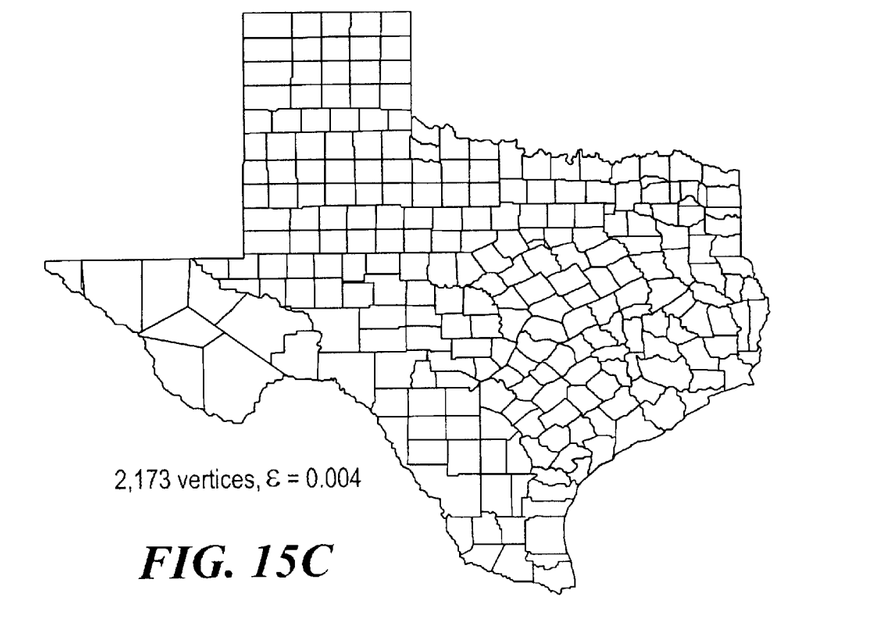

The second map TEXAS, which is shown in FIG. 15, is a detailed map of the state of Texas, containing both state and county lines. This map has 151,983 vertices and 817 chains. FIGS. 15A–C show the TEXAS map at varying levels of detail as set forth in Table 1 above. The third map (not shown), is a detailed map of Europe and Asia, containing both state boundaries as well as country boundaries. This map has 222,969 vertices and 2,674 chains.

Table 1 shows the level of simplification (in terms of the number of vertices in the simplified map) achieved for different values of the tolerance parameter $\epsilon$. Observe that visual fidelity is preserved, even when the number of vertices rendered is much less than that of the original map.

EXAMPLE 2

The system performance was also evaluated. First, the frame rates achieved by the system while navigating through the maps is reported. These frame rates are compared to the interactivity achieved when no simplification is performed. For this experiment, three maps are used: the maps USA and TEXAS described above, and a detailed map of the United States (called USA-FULL) that contains both state and county boundaries. This map has 1; 685; 300 vertices and 9,729 chains.

The results are shown in Table 2 below:

TABLE 2

|  | TEXAS | USA | USA-FULL |
|---|---|---|---|
| Our algorithm | 22–30 | 14–20 | 8 |
| Simple viewer | 11 | 6 | 0.9 |

For all the maps, the frame rate achieved by the system is superior to that achieved by a simple viewer that merely renders the unsimplified map, in spite of the extensive simplification computations that are performed at each frame. It can be seen that for the map USA-FULL, the frame rate of the simple viewer is 0:91 as compared to 8 for the exemplary system.

EXAMPLE 3

The relative amount of time spent on each step in the display cycle is also examined. Referring back to FIG. 13, there are five main steps in the rendering pipeline: OpenGL SELECT, view-dependent edge selection (proximity checking), Voronoi diagram construction, compliance checking, and shortest path computation. Table 3 below presents the relative fraction of time spent in each of these steps. The EURASIA map (not shown) refers to a map having 222,969 vertices.

TABLE 3

|  | TEXAS | USA | USA-FULL | EURASIA |
|---|---|---|---|---|
| OpenGL SELECT | 7 | 6 | 6 | 5 |
| Proximity checking | 9 | 10 | 17 | 17 |
| Voronoi diagram computation | 22 | 18 | 30 | 19 |
| Compliance checking | 54 | 60 | 37 | 48 |
| Shortest path computation | 8 | 6 | 9 | 10 |

The timings were generated (for each data set) by simulating a series of navigation paths in the viewer. The specific nature of the motion tends to have little effect on the percentage time spent. Note that preprocessing times are negligible for these maps; typical running time for the preprocessing phase is 0.5–1 second for the maps USA, TEXAS, and three seconds for USA-FULL.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for performing simplification of a map, comprising:
   generating voronoi diagrams for a plurality of non-intersecting chains defining the map;
   removing non-compliant shortcut segments based upon the voronoi diagrams; and
   removing non-proximate shortcut segments based upon the voronoi diagrams.

2. The method according to claim 1, further including determining shortest paths from the compliant, proximate segments to provide a simplified map.

3. The method according to claim 2, further including interactively displaying the simplified map.

4. The method according to claim 1, further including utilizing OpenGL graphics pipeline to remove non-visible ones of the plurality of chains.

5. The method according to claim 1, further including performing view-dependent simplification for real-time interactive map rendering.

6. The method according to claim 1, further including receiving point constraints.

7. A method of performing map simplification, comprising:

receiving a map comprising a predetermined number of non-intersecting chains;

receiving a set of tolerance parameters for processing the map;

determining a set of candidate shortcut segments for the chains;

determining $\epsilon$-Voronoi diagrams for the chains;

determining compliant shortcut segments from the $\epsilon$-Voronoi diagrams;

removing non-proximate shortcut segments from the compliant shortcut segments to provide a set of compliant, proximate segments for the chains;

determining shortest paths from a start to end of the chains based upon the set of compliant, proximate chain segments for providing a simplification of the map; and displaying the simplified map.

8. The method according to claim 7, further including determining the $\epsilon$-Voronoi diagrams with varying distances for the chains.

9. The method according to claim 7, further including determining the compliant shortcut segments by utilizing a graphics stencil test.

10. The method according to claim 9, further including utilizing the stencil test and rendering shortcut segments for a first one of the chains with unique colors.

11. The method according to claim 10, further including utilizing an OpenGL graphics function to ascertain the rendered colors.

12. The method according to claim 11, further including determining non-compliant shortcut segments based upon a color of the shortcut segments.

13. The method according to claim 7, further including removing the non-proximate segments by comparing a maximum distance to an original chain for a shortcut segment and a corresponding tolerance parameter.

14. The method according to claim 7 further including providing point constraints for the map.

15. The method according to claim 7, further including eliminating chains that are not visible in a current field of view.

16. The method according to claim 7, further including displaying the map such that chains closer to a viewer appear in more detail than chains that are further from the viewer.

17. The method according to claim 16, further including using chain-specific tolerance parameters to pick appropriate level-of-detail (LOD) for each of the chains.

18. A map simplification system, comprising:

a preprocessing module for computing an initial set of shortcut segments for a plurality of chains that define a map and generating a set of simplifications;

a selection module for receiving the set of simplifications and generating a view-dependent level of detail (LOD) for the chains;

a simplification module for receiving the chain LODs and determining compliant, proximate, shortest path segments for the chains to provide a simplified map.

19. The system according to claim 18, wherein the selection module generates voronoi diagrams for the chains.

20. A computer readable medium for performing map simplification comprising code enabling the steps of:

receiving a map comprising a predetermined number of non-intersecting chains;

receiving a set of tolerance parameters for processing the map;

determining a set of candidate shortcut segments for the chains;

determining $\epsilon$-Voronoi diagrams for the chains;

determining compliant shortcut segments from the $\epsilon$-Voronoi diagrams;

removing non-proximate shortcut segments from the compliant shortcut segments to provide a set of compliant, proximate segments for the chains;

determining shortest paths from a start to end of the chains based upon the set of compliant, proximate chain segments for providing a simplification of the map; and displaying the simplified map.

21. The medium according to claim 20, further including code enabling determining the $\epsilon$-Voronoi diagrams with varying distances for the chains.

22. The medium according to claim 20 further including code enabling determining the compliant shortcut segments by utilizing a graphics stencil test.

23. The medium according to claim 22, further including code enabling utilizing the stencil test and rendering shortcut segments for a first one of the chains with unique colors.

24. The medium according to claim 23, further including code enabling utilizing an OpenGL graphics function to ascertain the rendered colors.

25. The medium according to claim 24, further including code enabling determining non-compliant shortcut segments based upon a color of the shortcut segments.

26. The medium according to claim 25, further including code enabling removing the non-proximate segments by comparing a maximum distance to an original chain for a shortcut segment and a corresponding tolerance parameter.

27. The medium according to claim 20, further including eliminating chains that are not visible in a current field of view.

28. The medium according to claim 7, further including code enabling displaying the map such that chains closer to a viewer appear in more detail than chains that are further from the viewer.

29. The medium according to claim 28, further including code enabling using chain-specific tolerance parameters to pick appropriate level-of-detail (LOD) for each of the chains.

* * * * *